US011442762B2

(12) United States Patent
Morgan

(10) Patent No.: US 11,442,762 B2
(45) Date of Patent: *Sep. 13, 2022

(54) SYSTEMS AND METHODS FOR INTROSPECTIVE APPLICATION REPORTING TO FACILITATE VIRTUAL MACHINE MOVEMENT BETWEEN CLOUD HOSTS

(71) Applicant: Red Hat, Inc., Raleigh, NC (US)

(72) Inventor: Christopher Edwin Morgan, Raleigh, NC (US)

(73) Assignee: Red Hat, Inc., Raleigh, NC (US)

(*) Notice: Subject to any disclaimer, the term of this patent is extended or adjusted under 35 U.S.C. 154(b) by 28 days.

This patent is subject to a terminal disclaimer.

(21) Appl. No.: 16/160,905

(22) Filed: Oct. 15, 2018

(65) Prior Publication Data

US 2019/0050250 A1 Feb. 14, 2019

Related U.S. Application Data

(63) Continuation of application No. 13/118,009, filed on May 27, 2011, now Pat. No. 10,102,018.

(51) Int. Cl.
*G06F 9/455* (2018.01)

(52) U.S. Cl.
CPC .. *G06F 9/45558* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | |
|---|---|---|
| 6,463,457 B1 | 10/2002 | Armentrout et al. |
| 7,313,796 B2 | 12/2007 | Hamilton, II et al. |
| 7,439,937 B2 | 10/2008 | Ben-Shachar et al. |
| 7,529,785 B1 | 5/2009 | Spertus et al. |
| 7,546,462 B2 | 6/2009 | Upton |
| 7,596,620 B1 | 9/2009 | Colton et al. |
| 8,473,587 B1 | 6/2013 | Lappas et al. |
| 2001/0039497 A1 | 11/2001 | Hubbard |
| 2002/0069276 A1 | 6/2002 | Hino et al. |
| 2002/0165819 A1 | 11/2002 | McKnight et al. |
| 2003/0033344 A1 | 2/2003 | Abbott et al. |
| 2003/0037258 A1 | 2/2003 | Koren |
| 2003/0110252 A1 | 6/2003 | Yang-Huffman |

(Continued)

OTHER PUBLICATIONS

Pianese, "Toward a Cloud Operating System", IEEE (Year: 2010).*

(Continued)

*Primary Examiner* — Wynuel S Aquino
(74) *Attorney, Agent, or Firm* — Lowenstein Sandler LLP

(57) ABSTRACT

A processor from an introspection daemon running on a virtual machine can receive an introspection report comprising configuration state data of the virtual machine. The virtual machine can comprise a guest operating system hosting the introspection daemon. The configuration state data can comprise an execution state of an application running on the guest operating system of the virtual machine. The processor can generate a virtual machine image of the virtual machine in view of the introspection report. The processor can further initiate a migration of the virtual machine to at least one target cloud in view of the virtual machine image.

20 Claims, 5 Drawing Sheets

(56) References Cited

U.S. PATENT DOCUMENTS

| | | |
|---|---|---|
| 2003/0135609 A1 | 7/2003 | Carlson et al. |
| 2004/0162902 A1 | 8/2004 | Davis |
| 2004/0210591 A1 | 10/2004 | Hirschfeld et al. |
| 2004/0210627 A1 | 10/2004 | Kroening |
| 2004/0268347 A1 | 12/2004 | Knauerhase et al. |
| 2005/0131898 A1 | 6/2005 | Fatula, Jr. |
| 2005/0144060 A1 | 6/2005 | Chen et al. |
| 2005/0182727 A1 | 8/2005 | Robert et al. |
| 2005/0289540 A1 | 12/2005 | Nguyen et al. |
| 2006/0075042 A1 | 4/2006 | Wang et al. |
| 2006/0085530 A1 | 4/2006 | Garrett |
| 2006/0085824 A1 | 4/2006 | Bruck et al. |
| 2006/0130144 A1 | 6/2006 | Wernicke |
| 2006/0177058 A1 | 8/2006 | Sarwono et al. |
| 2006/0224436 A1 | 10/2006 | Matsumoto et al. |
| 2007/0011291 A1 | 1/2007 | Mi et al. |
| 2007/0028001 A1 | 2/2007 | Phillips et al. |
| 2007/0043860 A1 | 2/2007 | Pabari |
| 2007/0226715 A1 | 9/2007 | Kimura et al. |
| 2007/0283282 A1 | 12/2007 | Bonfiglio et al. |
| 2007/0294676 A1 | 12/2007 | Mellor et al. |
| 2007/0294689 A1* | 12/2007 | Garney ............. G06F 9/5077 718/1 |
| 2008/0080396 A1 | 4/2008 | Meijer et al. |
| 2008/0080718 A1 | 4/2008 | Meijer et al. |
| 2008/0082538 A1 | 4/2008 | Meijer et al. |
| 2008/0082601 A1 | 4/2008 | Meijer et al. |
| 2008/0083025 A1 | 4/2008 | Meijer et al. |
| 2008/0083040 A1 | 4/2008 | Dani et al. |
| 2008/0086727 A1 | 4/2008 | Lam et al. |
| 2008/0091613 A1 | 4/2008 | Gates et al. |
| 2008/0104608 A1 | 5/2008 | Hyser et al. |
| 2008/0201455 A1* | 8/2008 | Husain ............. G06F 9/445 709/220 |
| 2008/0215796 A1 | 9/2008 | Lam et al. |
| 2008/0240150 A1 | 10/2008 | Dias et al. |
| 2008/0275884 A1 | 11/2008 | Yoshida et al. |
| 2009/0012885 A1 | 1/2009 | Cahn |
| 2009/0025006 A1 | 1/2009 | Waldspurger |
| 2009/0037496 A1 | 2/2009 | Chong et al. |
| 2009/0089078 A1 | 4/2009 | Bursey |
| 2009/0099940 A1 | 4/2009 | Frederick et al. |
| 2009/0132695 A1 | 5/2009 | Surtani et al. |
| 2009/0177514 A1 | 7/2009 | Hudis et al. |
| 2009/0210527 A1 | 8/2009 | Kawato |
| 2009/0210875 A1 | 8/2009 | Bolles et al. |
| 2009/0217267 A1 | 8/2009 | Gebhart et al. |
| 2009/0222805 A1 | 9/2009 | Faus et al. |
| 2009/0228950 A1 | 9/2009 | Reed et al. |
| 2009/0248693 A1 | 10/2009 | Sagar et al. |
| 2009/0249287 A1 | 10/2009 | Patrick |
| 2009/0260007 A1 | 10/2009 | Beaty et al. |
| 2009/0265706 A1 | 10/2009 | Golosovker et al. |
| 2009/0265707 A1 | 10/2009 | Goodman et al. |
| 2009/0271324 A1 | 10/2009 | Jandhyala et al. |
| 2009/0276771 A1 | 11/2009 | Nickolov et al. |
| 2009/0287691 A1 | 11/2009 | Sundaresan et al. |
| 2009/0293056 A1 | 11/2009 | Ferris |
| 2009/0299905 A1 | 12/2009 | Mestha et al. |
| 2009/0299920 A1 | 12/2009 | Ferris et al. |
| 2009/0300057 A1 | 12/2009 | Friedman |
| 2009/0300149 A1 | 12/2009 | Ferris et al. |
| 2009/0300151 A1 | 12/2009 | Friedman et al. |
| 2009/0300152 A1 | 12/2009 | Ferris |
| 2009/0300162 A1 | 12/2009 | Demarie et al. |
| 2009/0300169 A1 | 12/2009 | Sagar et al. |
| 2009/0300210 A1 | 12/2009 | Ferris |
| 2009/0300423 A1 | 12/2009 | Ferris |
| 2009/0300607 A1 | 12/2009 | Ferris et al. |
| 2009/0300608 A1 | 12/2009 | Ferris et al. |
| 2009/0300635 A1 | 12/2009 | Ferris |
| 2009/0300641 A1 | 12/2009 | Friedman et al. |
| 2009/0300719 A1 | 12/2009 | Ferris |
| 2009/0313503 A1 | 12/2009 | Atluri |
| 2010/0042720 A1 | 2/2010 | Stienhans et al. |
| 2010/0050172 A1 | 2/2010 | Ferris |
| 2010/0057831 A1 | 3/2010 | Williamson |
| 2010/0058347 A1 | 3/2010 | Smith et al. |
| 2010/0131324 A1 | 5/2010 | Ferris |
| 2010/0131590 A1 | 5/2010 | Coleman et al. |
| 2010/0131624 A1 | 5/2010 | Ferris |
| 2010/0131649 A1 | 5/2010 | Ferris |
| 2010/0131948 A1 | 5/2010 | Ferris |
| 2010/0131949 A1 | 5/2010 | Ferris |
| 2010/0132016 A1 | 5/2010 | Ferris |
| 2010/0169477 A1 | 7/2010 | Stienhans et al. |
| 2010/0217850 A1 | 8/2010 | Ferris |
| 2010/0217864 A1 | 8/2010 | Ferris |
| 2010/0217865 A1 | 8/2010 | Ferris |
| 2010/0220622 A1 | 9/2010 | Wei |
| 2010/0299366 A1 | 11/2010 | Stienhans et al. |
| 2010/0306354 A1 | 12/2010 | DeHaan et al. |
| 2010/0306377 A1 | 12/2010 | DeHaan et al. |
| 2010/0306379 A1 | 12/2010 | Ferris |
| 2010/0306566 A1 | 12/2010 | Dehaan et al. |
| 2010/0306765 A1 | 12/2010 | DeHaan |
| 2010/0306767 A1 | 12/2010 | Dehaan |
| 2010/0313200 A1 | 12/2010 | Rozee et al. |
| 2011/0016214 A1 | 1/2011 | Jackson |
| 2011/0023029 A1* | 1/2011 | Diab ............. G06F 9/5077 718/1 |
| 2011/0055034 A1 | 3/2011 | Ferris et al. |
| 2011/0055377 A1 | 3/2011 | Dehaan |
| 2011/0055378 A1 | 3/2011 | Ferris et al. |
| 2011/0055396 A1 | 3/2011 | Dehaan |
| 2011/0055398 A1 | 3/2011 | Dehaan et al. |
| 2011/0055588 A1 | 3/2011 | DeHaan |
| 2011/0131183 A1* | 6/2011 | Chandhok ............ G06F 11/1458 707/634 |
| 2011/0131335 A1 | 6/2011 | Spaltro et al. |
| 2011/0197039 A1 | 8/2011 | Green et al. |
| 2011/0202918 A1* | 8/2011 | Park ............. G06F 9/45541 718/1 |
| 2011/0265084 A1* | 10/2011 | Knowles ............. G06F 9/461 718/1 |
| 2011/0265164 A1 | 10/2011 | Lucovsky et al. |
| 2011/0314466 A1* | 12/2011 | Berg ............. G06F 9/5072 718/1 |
| 2012/0084445 A1* | 4/2012 | Brock ............. G06F 9/5077 709/226 |
| 2012/0203739 A1* | 8/2012 | Soundararajan ...... G06F 9/5077 707/639 |

OTHER PUBLICATIONS

Qiang Li, "Adaptive Management of Virtualized Resources in Cloud Computing Using Feedback Control", Dec. 26, 2009, IEEE.
Fabio Pianese, Toward a Cloud Operating System, 2010, IEEE.
"rBulider and the rPath Appliance Platform" 2007 rPath, inc., mivw.rpath.com, 3 pgs.
White Paper—'Best Practices for Building Virtual Appliances', 2008 rPath, Inc , www.rpath,com, 6 pgs.
DeHaan et al., Systems and Methods for Secure Distributed Storage, U.S. Appl. No. 12/610,081, filed Oct. 30, 2009.
Ferris, et al., "Methods and Systems for Monitoring Cloud Computing Environment", U.S. Appl. No. 12/627,764, filed Nov. 30, 2009.
Ferris et al., "Methods and Systems for Detecting Events in Cloud Computing Environments and Performing Actions Upon Occurrence of the Events", U.S. Appl. No. 12/627,646, filed Nov. 30, 2009.
Ferris et al., "Methods and Systems for Verifying Software License Compliance in Cloud Computing Environments", U.S. Appl. No. 12/627,643, filed Nov. 30, 2009.
Ferris et al., "Systems and Methods for Service Aggregation Using Graduated Service Levels in a Cloud Network", U.S. Appl. No. 12/628,112, filed Nov. 30, 2009.
Ferris et al., "Methods and Systems for Generating a Software License Knowledge Base for Vareifying Software License Compliance in Cloud Computing Environments", U.S. Appl. No. 12/628,156, filed Nov. 30, 2009.

(56) References Cited

OTHER PUBLICATIONS

Ferris et al., "Methods and Sytems for Converting Standard Software Licenses for Use in Cloud Computing Environments", U.S. Appl. No. 12/714,099, filed Feb. 26, 2010.
Ferris et al., "Systems and Methods for Managing a Software Subscription in a Cloud Network", U.S. Appl. No. 12/714,096, filed Feb. 26, 2010.
Ferris et al., "Methods and Systems for Providing Deployment Architectures in Cloud Computing Environments", U.S. Appl. No. 12/714,427, filed Feb. 26, 2010.
Ferris et al., "Methods and Systems for Matching Resource Requests with Cloud Computing Environments", U.S. Appl. No. 12/714,113, filed Feb. 26, 2010.
Ferris et al., "Systems and Methods for Generating Cross-Cloud Computing Appliances", U.S. Appl. No. 12/714,315, filed Feb. 26, 2010.
Ferris et al., "Systems and Methods for Cloud-Based Brokerage Exchange of Software Entitlements", U.S. Appl. No. 12/714,302, filed Feb. 26, 2010.
Ferris et al., "Methods and Systems for Offering Additional License Terms During Conversion of Standard Software Licenses for Use in Cloud Computing Environments", U.S. Appl. No. 12/714,065, filed Feb. 26, 2010.
Ferris et al., "Systems and Methods for or a Usage Manager for Cross-Cloud Appliances", U.S. Appl. No. 12/714,334, filed Feb. 26, 2010.
Ferris et al., "Systems and Methods for Delivery of User-Controlled Resources in Cloud Environments Via A Resource Specification Language Wrapper", U.S. Appl. No. 12/790,294, filed May 28, 2010.
Ferris et al., "Systems and Methods for Managing Multi-Level Service Level Agreements in Cloud Based Networks", U.S. Appl. No. 12/789,660, filed May 28, 2010.
Ferris et al., "Methods and Systems for Generating Cross-Mapping of Vendor Software in a Cloud Computing Environment", U.S. Appl. No. 12/790,527, filed May 28, 2010.
Ferris et al., "Methods and Systems for Cloud Deployment Analysis Featuring Relative Cloud Resource Importance", U.S. Appl. No. 12/790,366, filed May 28, 2010.
Ferris et al., "Systems and Methods for Generating Customized Build Options for Cloud Deployment Matching Usage Profile Against Cloud Infrastructure Options", U.S. Appl. No. 12/789,701, filed May 28, 2010.
Ferris et al., "Systems and Methods for Exporting Usage History Data as Input to a Management Platform of a Target Cloud-Based Network", U.S. Appl. No. 12/790,415, filed May 28, 2010.
Ferris et al., "Systems and Methods for Cross-Vendor Mapping Service in Cloud Networks", U.S. Appl. No. 12/790,162, filed May 28, 2010.
Ferris et al., "Systems and Methods for Cross-Cloud Vendor Mapping Service in a Dynamic Cloud Marketplace", U.S. Appl. No. 12/790,229, filed May 28, 2010.
Ferris et al., "Systems and Methods for Aggregate Monitoring of Utilization Data for Vendor Products in Cloud Networks", U.S. Appl. No. 12/790,039, filed May 28, 2010.
Ferris, et al., "Systems and Methods for Combinatorial Optimization of Multiple Resources Across a Set of Cloud-Based Networks", U.S. Appl. No. 12/953,718, filed Nov. 24, 2010.
Ferris et al., "Systems and Methods for Matching a Usage History to a New Cloud", U.S. Appl. No. 12/953,757, filed Nov. 24, 2010.
Ferris et al., "Systems and Methods for Identifying Usage Histories for Producing Optimized Cloud Utilization", U.S. Appl. No. 12/952,930, filed Nov. 23, 2010.
Ferris et al., "Systems and Methods for Identifying Service Dependencies in a Cloud Deployment", U.S. Appl. No. 12/952,857, filed Nov. 23, 2010.
Ferris et al., "Systems and Methods for Migrating Subscribed Services in a Cloud Deployment", U.S. Appl. No. 12/955,277, filed Nov. 29, 2010.
Ferris et al., "Systems and Methods for Migrating Subscribed Services from a Set of Clouds to a Second Set of Clouds", U.S. Appl. No. 12/957,281, filed Nov. 30, 2010.
Morgan, "Systems and Methods for Generating Multi-Cloud Incremental Billing Caputre and Administration", U.S. Appl. No. 12/954,323, filed Nov. 24, 2010.
Morgan, "Systems and Methods for Aggregating Marginal Subscription Offsets in a Set of Multiple Host Clouds", U.S. Appl. No. 12/954,400, filed Nov. 24, 2010.
Morgan, "Systems and Methods for Generating Dynamically Configurable Subscription Parameters for Temporary Migration of Predictive User Workloads in Cloud Network", U.S. Appl. No. 12/954,378, filed Nov. 24, 2010.
Morgan, "Systems and Methods for Managing Subscribed Resource Limits in Cloud Network Using Variable of Instantaneous Consumption Tracking Periods", U.S. Appl. No. 12/954,352, filed Nov. 24, 2010.
Ferris et al., "Systems and Methods for Migrating Software Modules into One or More Clouds", U.S. Appl. No. 12/952,701, filed Nov. 23, 2010.
Ferris et al., "Systems and Methods for Brokering Optimized Resource Supply Costs in Host Cloud-Based Network Using Predictive Workloads", U.S. Appl. No. 12/957,274, filed Nov. 30, 2010.
Ferris et al., "Systems and Methods for Reclassifying Virtual Machines to Target Virtual Machines or Appliances Based on Code Analysis in a Cloud Environment", U.S. Appl. No. 12/957,267, filed Nov. 30, 2010.
Morgan, "Systems and Methods for Generating Optimized Resource Consumption Periods for Multiple Users on Combined Basis", U.S. Appl. No. 13/037,359, filed Mar. 1, 2011.
Morgan, "Systems and Methods for Generating Marketplace Brokerage Exchange of Excess Subscribed Resources Using Dynamic Subscription Periods", U.S. Appl. No. 13/037,351, filed Feb. 28, 2011.
Morgan, "Systems and Methods for Detecting Resource Consumption Events Over Sliding Intervals in Cloud-Based Network", U.S. Appl. No. 13/149,235, filed May 31, 2011.
Morgan, "Systems and Methods for Triggering Workload Movement Based on Policy Stack Having Multiple Selectable Inputs", U.S. Appl. No. 13/149,418, filed May 31, 2011.
Morgan, "Systems and Methods for Cloud Deployment Engine for Selective Workload Migration or Federation Based on Workload Conditions", U.S. Appl. No. 13/117,937, filed May 27, 2011.
Morgan, "Systems and Methods for Tracking Cloud Installation Information Using Cloud-Aware Kernel of Operating Systems", U.S. Appl. No. 13/149,750, filed May 31, 2011.
Morgan, "Systems and Methods for Self-Moving Operating System Installation in Cloud-Based Network", U.S. Appl. No. 13/149,877, filed May 31, 2011.
Morgan, "Systems and Methods for Methods for Metering Cloud Resource Consumption Using Multiple Hierarchical Subscription Periods", U.S. Appl. No. 13/037,360, filed Mar. 1, 2011.
White Paper—"rPath Versus Other Software Appliance Approaches", Mar. 2008, rPath, Inc., www.rpath.com, 9 pgs.

* cited by examiner

SYSTEMS AND METHODS FOR INTROSPECTIVE APPLICATION REPORTING TO FACILITATE VIRTUAL MACHINE MOVEMENT BETWEEN CLOUD HOSTS

RELATED APPLICATION

This continuation application claims priority to U.S. patent application Ser. No. 13/118,009, filed on May 27, 2011 and entitled "SYSTEMS AND METHODS FOR INTROSPECTIVE APPLICATION REPORTING TO FACILITATE VIRTUAL MACHINE MOVEMENT BETWEEN CLOUD HOSTS," which is incorporated by reference herein.

FIELD

The invention relates generally to systems and methods for introspective application reporting to facilitate virtual machine movement between cloud hosts, and more particularly, to platforms and techniques for generating and managing the self-reporting of application sets and other configuration data from virtual machines in a cloud to the kernel of a cloud-based operating system supporting those virtual machines, and generating migratable images of those machines at the kernel level using those inventories or reports.

BACKGROUND

The advent of cloud-based computing architectures has opened new possibilities for the rapid and scalable deployment of virtual Web stores, media outlets, social networking sites, and many other on-line sites or services. In general, a cloud-based architecture deploys a set of hosted resources such as processors, operating systems, software and other components that can be combined together to form virtual machines. A user or customer can request the instantiation of a virtual machine or set of machines from those resources from a central server or cloud management system to perform intended tasks, services, or applications. For example, a user may wish to set up and instantiate a virtual server from the cloud to create a storefront to market products or services on a temporary basis, for instance, to sell tickets to or merchandise for an upcoming sports or musical performance. The user can subscribe to the set of resources needed to build and run the set of instantiated virtual machines on a comparatively short-term basis, such as hours or days, for their intended application.

Typically, when a user utilizes a cloud, the user must track the software applications executed in the cloud and/or processes instantiated in the cloud. For example, the user must track the cloud processes to ensure that the correct cloud processes have been instantiated, that the cloud processes are functioning properly and/or efficiently, that the cloud is providing sufficient resources to the cloud processes, and so forth. Due in part to the user's requirements and overall usage of the cloud, the user may have many applications and/or processes instantiated in a cloud at any given instant, and the user's deployment of virtual machines, software, and other resources can change dynamically over time. In cases, the user may also utilize multiple independent host clouds to support the user's cloud deployment. That user may further instantiate and use multiple applications or other software or services inside or across multiple of those cloud boundaries, and those resources may be used or consumed by multiple or differing end-user groups in those different cloud networks.

In terms of the management of a set of virtual machines operated by a user in a cloud, each machine in a set of virtual machines can have an associated set of installed applications and other resources managed by the cloud management system of the host cloud or clouds. In cases, the user or operator of the virtual machines may wish to migrate or move those virtual machines to another cloud host. To perform that task, the user will need to interrogate the virtual machines to acquire their associated set of applications, the execution state of those applications, data associated with those applications, and/or other configuration data. In existing cloud management systems, the extraction of those reports and data is not configured to be automatically performed, and typically requires software, applications, logic, or tools that execute on top of the cloud-based operating system to set up the capture of those virtual machine images and eventually, to initiate the migration of those machines to other potential hosts.

It may be desirable to provide systems and methods for introspective application reporting to facilitate virtual machine movement between cloud hosts, in which the self-reporting of virtual machines and/or their constituent applications and other configuration data can be automatically captured at the level of the kernel of the cloud-based operating system, where the kernel is likewise configured to initiate downstream migration of selected virtual machines and/or their application complements.

DESCRIPTION

Figure 1:
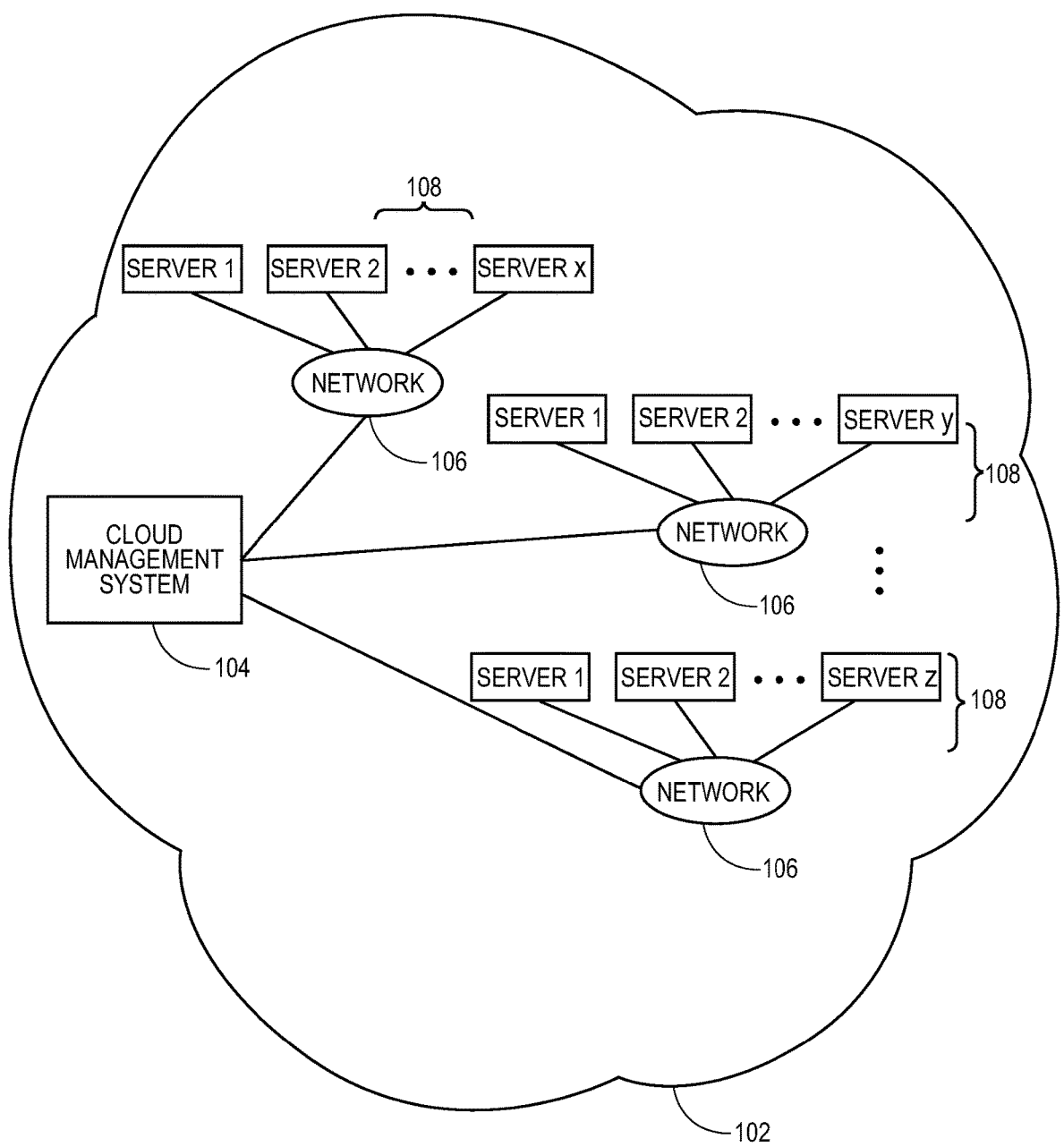
FIG. 1 illustrates an overall cloud system architecture in which various aspects of systems and methods for introspective application reporting to facilitate virtual machine movement between cloud hosts can be implemented, according to embodiments.

Embodiments described herein can be implemented in or supported by a cloud network architecture. As used herein, a "cloud" can comprise a collection of hardware, software, services, and/or resources that can be invoked to instantiate a virtual machine, process, or other resource for a limited or defined duration. As shown for example in FIG. 1, the collection of resources supporting a cloud 102 can at a hardware level comprise a set of resource servers 108 configured to deliver computing components needed to instantiate a virtual machine, process, service, or other resource. For example, one group of resource servers in set of resource servers 108 can host and serve an operating system, and/or components, utilities, or interfaces related to that operating system, to deliver to a virtual target, and instantiate that machine with an image of that operating system. Another group of servers in set of resource servers 108 can accept requests to host computing cycles or processor time, memory allocations, communications ports or links, and/or other resources to supply a defined level of processing power or throughput for a virtual machine. A further group of resource servers in set of resource servers 108 can host and serve applications or other software to load on an instantiation of a virtual machine, such as an email client, a browser application, a messaging application, or other applications, software, or services. Other types of resource servers can be used to support one or more clouds 102.

In embodiments, the entire set of resource servers 108 and/or other hardware or software resources used to support one or more clouds 102, along with the set of instantiated virtual machines, can be managed by a cloud management system 104. The cloud management system 104 can comprise a dedicated or centralized server and/or other software, hardware, services, and network tools that communicate via network 106, such as the Internet or other public or private network, with all servers in set of resource servers 108 to manage the cloud 102 and its operation. To instantiate a new or updated set of virtual machines, a user can transmit an instantiation request to the cloud management system 104 for the particular type of virtual machine they wish to invoke for their intended application. A user can for instance make a request to instantiate a set of virtual machines configured for email, messaging or other applications from the cloud 102. The virtual machines can be instantiated as virtual client machines, virtual appliance machines consisting of special-purpose or dedicated-task machines as understood in the art, and/or as other virtual machines or entities. The request to invoke and instantiate the desired complement of virtual machines can be received and processed by the cloud management system 104, which identifies the type of virtual machine, process, or other resource being requested in that platform's associated cloud. The cloud management system 104 can then identify the collection of hardware, software, service, and/or other resources necessary to instantiate that complement of virtual machines or other resources. In embodiments, the set of instantiated virtual machines or other resources can, for example, and as noted, comprise virtual transaction servers used to support Web storefronts, Web pages, and/or other transaction sites.

In embodiments, the user's instantiation request can specify a variety of parameters defining the operation of the set of virtual machines to be invoked. The instantiation request, for example, can specify a defined period of time for which the instantiated collection of machines, services, or processes is needed. The period of time can be, for example, an hour, a day, a month, or other interval of time. In embodiments, the user's instantiation request can specify the instantiation of a set of virtual machines or processes on a task basis, rather than for a predetermined amount or interval of time. For instance, a user could request a set of virtual provisioning servers and other resources until a target software update is completed on a population of corporate or other machines. The user's instantiation request can in further regards specify other parameters that define the configuration and operation of the set of virtual machines or other instantiated resources. For example, the request can specify a specific minimum or maximum amount of processing power or input/output (I/O) throughput that the user wishes to be available to each instance of the virtual machine or other resource. In embodiments, the requesting user can for instance specify a service level agreement (SLA) acceptable for their desired set of applications or services. Other parameters and settings can be used to instantiate and operate a set of virtual machines, software, and other resources in the host clouds. One skilled in the art will realize that the user's request can likewise include combinations of the foregoing exemplary parameters, and others. It may be noted that "user" herein can include a network-level user or subscriber to cloud-based networks, such as a corporation, government entity, educational institution, and/ or other entity, including individual users and groups of users.

When the request to instantiate a set of virtual machines or other resources has been received and the necessary resources to build those machines or resources have been identified, the cloud management system 104 can communicate with one or more set of resource servers 108 to locate resources to supply the required components. Generally, the cloud management system 104 can select servers from the diverse set of resource servers 108 to assemble the various components needed to build the requested set of virtual machines, services, or other resources. It may be noted that in some embodiments, permanent storage, such as optical storage or hard disk arrays, may or may not be included or located within the set of resource servers 108 available to the cloud management system 104, since the set of instantiated virtual machines or other resources may be intended to operate on a purely transient or temporary basis. In embodiments, other hardware, software or other resources not strictly located or hosted in one or more clouds 102 can be accessed and leveraged as needed. For example, other software or services that are provided outside of one or more clouds 102 acting as hosts, and are instead hosted by third parties outside the boundaries of those clouds, can be invoked by in-cloud virtual machines or users. For further example, other non-cloud hardware and/or storage services can be utilized as an extension to the one or more clouds 102 acting as hosts or native clouds, for instance, on an on-demand, subscribed, or event-triggered basis.

With the resource requirements identified for building a network of virtual machines, the cloud management system 104 can extract and build the set of virtual machines or other resources on a dynamic, on-demand basis. For example, one set of resource servers 108 may respond to an instantiation request for a given quantity of processor cycles with an offer to deliver that computational power immediately and guaranteed for the next hour or day. A further set of resource servers 108 can offer to immediately supply communication bandwidth, for example on a guaranteed minimum or best-efforts basis, for instance over a defined window of time. In other embodiments, the set of virtual machines or other resources can be built on a batch basis, or at a particular future time. For example, a set of resource servers 108 may respond to a request for instantiation of virtual machines at a programmed time with an offer to deliver the specified quantity of processor cycles within a specific amount of time, such as the next 12 hours. Other timing and resource configurations are possible.

After interrogating and receiving resource commitments from the set of resource servers 108, the cloud management system 104 can select a group of servers in the set of resource servers 108 that match or best match the instantiation request for each component needed to build the user's requested virtual machine, service, or other resource. The cloud management system 104 for the one or more clouds 102 acting as the destination for the virtual machines can then coordinate the integration of the identified group of servers from the set of resource servers 108, to build and launch the requested set of virtual machines or other resources. The cloud management system 104 can track the identified group of servers selected from the set of resource servers 108, or other distributed resources that are dynamically or temporarily combined, to produce and manage the requested virtual machine population, services, or other cloud-based resources.

In embodiments, the cloud management system 104 can generate a resource aggregation table or other record that identifies the various selected sets of resource servers in set of resource servers 108 that will be used to supply the components of the set of instantiated virtual machines, services, or processes. The selected sets of resource servers can be identified by unique identifiers such as, for instance, Internet protocol (IP) addresses or other addresses. In aspects, different sets of servers in set of resource servers 108 can be selected to deliver different resources to different users and/or for different applications. The cloud management system 104 can register the finalized group of servers in the set resource servers 108 contributing to or otherwise supporting the set of instantiated machines, services, or processes.

The cloud management system 104 can then set up and launch the initiation process to instantiate the virtual machines, processes, services, and/or other resources to be hosted and delivered from the one or more clouds 102. The cloud management system 104 can for instance transmit an instantiation command or instruction to the registered group of servers in the set of resource servers 108. The cloud management system 104 can receive a confirmation message back from each registered server in set of resource servers 108 indicating a status or state regarding the provisioning of their respective resources. Various registered resource servers may confirm, for example, the availability of a dedicated amount of processor cycles, amounts of electronic memory, communications bandwidth, services, and/or applications or other software prepared to be served and delivered.

Figure 2:
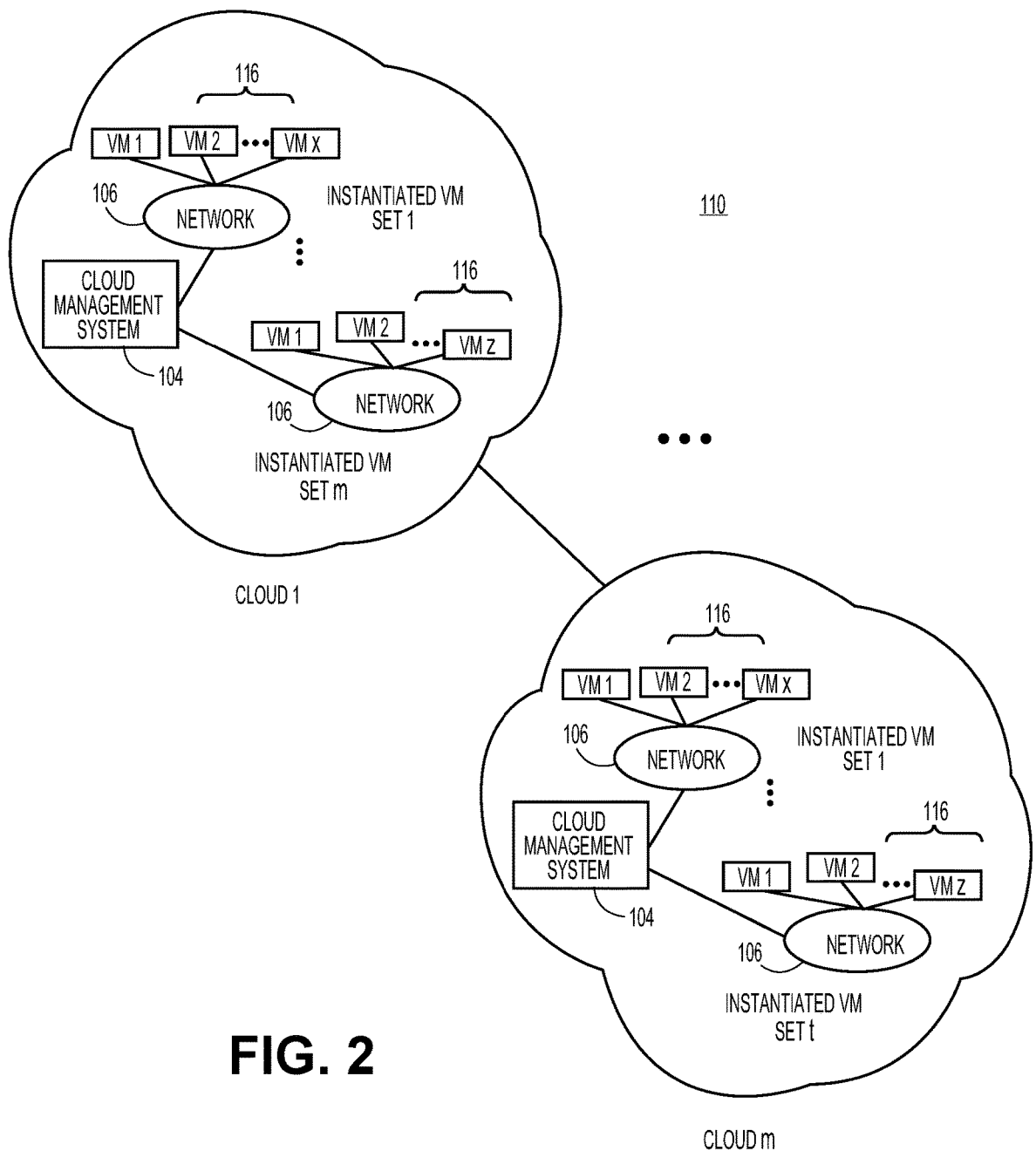
FIG. 2 illustrates an overall cloud system architecture in which various aspects of systems and methods for introspective application reporting to facilitate virtual machine movement between cloud hosts can be implemented, in further regards.

As shown for example in FIG. 2, after coordination of the sources and configuration of resources including the hardware layer, selected software, and/or other resources, the cloud management system 104 can then instantiate a set of virtual machines 116, and/or other appliances, services, processes, and/or entities, based on the resources supplied by servers within set of resource servers 108 registered to support the one or more clouds 102 in a multiple-cloud network 110. According to aspects, cloud management system 104 can access or interact with a virtualization module, platform, or service to instantiate and operate set of virtual machines 116, such as the kernel-based virtualization manager (KVM™) available from Red Hat, Inc. of Raleigh, N.C., or others. In embodiments, the cloud management system 104 can instantiate a given number, for example, 10, 500, 1000, 20,000, or other numbers or instances of virtual machines to populate one or more clouds 102 and be made available to users of that cloud or clouds. In aspects, users may access the one or more clouds 102 via the Internet, or other public or private networks. Each virtual machine can be assigned an instantiated machine ID that can be stored in the resource aggregation table, or other record or image of the instantiated virtual machine population. Additionally, the cloud management system 104 can store data related to the duration of the existence or operation of each operating virtual machine, as well as the collection of resources utilized by the overall set of instantiated virtual machines 116.

In embodiments, the cloud management system 104 can further store, track and manage each user's identity and associated set of rights or entitlements to software, hardware, and other resources. Each user that operates a virtual machine or service in the set of virtual machines in the cloud can have specific rights and resources assigned and made available to them, with associated access rights and security provisions. The cloud management system 104 can track and configure specific actions that each user can perform, such as the ability to provision a set of virtual machines with software applications or other resources, configure a set of virtual machines to desired specifications, submit jobs to the set of virtual machines or other host, manage other users of the set of instantiated virtual machines 116 or other resources, and/or other privileges, entitlements, or actions. The cloud management system 104 associated with the virtual machine(s) of each user can further generate records of the usage of instantiated virtual machines to permit tracking, billing, and auditing of the resources and services consumed by the user or set of users. In aspects of the present teachings, the tracking of usage activity for one or more user (including network level user and/or end-user) can be abstracted from any one cloud to which that user is registered, and made available from an external or independent usage tracking service capable of tracking software and other usage across an arbitrary collection of clouds, as described herein. In embodiments, the cloud management system 104 of an associated cloud can for example meter the usage and/or duration of the set of instantiated virtual machines 116, to generate subscription and/or billing records for a user that has launched those machines. In aspects, tracking records can in addition or instead be generated by an internal service operating within a given cloud. Other subscription, billing, entitlement and/or value arrangements are possible.

The cloud management system 104 can configure each virtual machine in set of instantiated virtual machines 116 to be made available to users via one or more networks 116, such as the Internet or other public or private networks. Those users can for instance access set of instantiated virtual machines via a browser interface, via an application server such as a Java™ server, via an application programming interface (API), and/or other interface or mechanism. Each instantiated virtual machine in set of instantiated virtual machines 116 can likewise communicate with its associated cloud management system 104 and the registered servers in set of resource servers 108 via a standard Web application programming interface (API), or via other calls, protocols, and/or interfaces. The set of instantiated virtual machines 116 can likewise communicate with each other, as well as other sites, servers, locations, and resources available via the Internet or other public or private networks, whether within a given cloud in one or more clouds 102, or between those or other clouds.

It may be noted that while a browser interface or other front-end can be used to view and operate the set of instantiated virtual machines 116 from a client or terminal, the processing, memory, communications, storage, and other hardware as well as software resources required to be combined to build the virtual machines or other resources are all hosted remotely in the one or more clouds 102. In embodiments, the set of virtual machines 116 or other services, machines, or resources may not depend in any degree on or require the user's own on-premise hardware or other resources. In embodiments, a user can therefore request and instantiate a set of virtual machines or other resources on a purely off-premise basis, for instance to build and launch a virtual storefront, messaging site, and/or any other application. Likewise, one or more clouds 102 can also be formed in whole or part from resources hosted or maintained by the users of those clouds, themselves.

Because the cloud management system 104 in one regard specifies, builds, operates and manages the set of instantiated virtual machines 116 on a logical or virtual level, the user can request and receive different sets of virtual machines and other resources on a real-time or near real-time basis, without a need to specify, install, or configure any particular hardware. The user's set of instantiated virtual machines 116, processes, services, and/or other resources can in one regard therefore be scaled up or down immediately or virtually immediately on an on-demand basis, if desired. In embodiments, the set of resource servers 108 that are accessed by the cloud management system 104 to support the set of instantiated virtual machines 116 or processes can change or be substituted, over time. The type and operating characteristics of the set of instantiated virtual machines 116 can nevertheless remain constant or virtually constant, since instances are assembled from a collection of abstracted resources that can be selected and maintained from diverse sources based on uniform specifications. Conversely, the users of the set of instantiated virtual machines 116 can also change or update the resource or operational specifications of those machines at any time. The cloud management system 104 and/or other logic can then adapt the allocated resources for that population of virtual machines or other entities, on a dynamic basis.

In terms of network management of the set of instantiate virtual machines 116 that have been successfully configured and instantiated, the one or more cloud management systems 104 associated with those machines can perform various network management tasks including security, maintenance, and metering for billing or subscription purposes. The cloud management system 104 of one or more clouds 102 can, for example, install, initiate, suspend, or terminate instances of applications or appliances on individual machines. The cloud management system 104 can similarly monitor one or more operating virtual machines to detect any virus or other rogue process on individual machines, and for instance terminate an application identified as infected, or a virtual machine detected to have entered a fault state. The cloud management system 104 can likewise manage the set of instantiated virtual machines 116 or other resources on a network-wide or other collective basis, for instance, to push the delivery a software upgrade to all active virtual machines or subsets of machines. Other network management processes can be carried out by cloud management system 104 and/or other associated logic.

In embodiments, more than one set of virtual machines can be instantiated in a given cloud at the same time, at overlapping times, and/or at successive times or intervals. The cloud management system 104 can, in such implementations, build, launch and manage multiple sets of virtual machines as part of the set of instantiated virtual machines 116 based on the same or different underlying set of resource servers 108, with populations of different virtual machines such as may be requested by the same or different users. The cloud management system 104 can institute and enforce security protocols in one or more clouds 102 hosting one or more sets of virtual machines. Each of the individual sets or subsets of virtual machines in the set of instantiated virtual machines 116 can be hosted in a respective partition or sub-cloud of the resources of the main cloud 102. The cloud management system 104 of one or more clouds 102 can for example deploy services specific to isolated or defined sub-clouds, or isolate individual workloads/processes within the cloud to a specific sub-cloud or other sub-domain or partition of the one or more clouds 102 acting as host. The subdivision of one or more clouds 102 into distinct transient sub-clouds, sub-components, or other subsets which have assured security and isolation features can assist in establishing a multiple user or multi-tenant cloud arrangement. In a multiple-user scenario, each of the multiple users can use the cloud platform as a common utility while retaining the assurance that their information is secure from other users of the same one or more clouds 102. In further embodiments, sub-clouds can nevertheless be configured to share resources, if desired.

In embodiments, and as also shown in FIG. 2, the set of instantiated virtual machines 116 generated in a first cloud in one or more clouds 102 can also interact with a set of instantiated virtual machines, services, and/or processes generated in a second, third or further cloud in one or more clouds 102, comprising a multiple-cloud network 110. The cloud management system 104 of a first cloud of one or more clouds 102 can interface with the cloud management system 104 of a second, third, or further cloud of one or more clouds 102 to coordinate those domains and operate the clouds and/or virtual machines, services, and/or processes on a combined basis. The cloud management system 104 of a given cloud on one or more clouds 102 can in aspects track and manage individual virtual machines or other resources instantiated in that cloud, as well as the set of instantiated virtual machines or other resources in other clouds.

In the foregoing and other embodiments, the user making an instantiation request or otherwise accessing or utilizing the cloud network can be a person, customer, subscriber, administrator, corporation, organization, government, and/or other entity. In embodiments, the user can be or include another virtual machine, application, service and/or process. In further embodiments, multiple users or entities can share the use of a set of virtual machines or other resources.

Aspects of the present teachings relate to platforms and techniques in which a set of virtual machines operated by a user in one or more host clouds can be configured with an introspection daemon and/or other reporting logic to generate an introspection report including an inventory of applications installed and/or executing on those machines, and report that inventory along with potential configuration state data to a cloud-based operating system used to host the virtual machines. In aspects, the operating system can be configured with a set of kernel-based or kernel-hosted services or other resources to receive the introspection report, organize and record that information using a virtual machine image manager and/or other tool, and generate a set of migratable virtual machine images for potential deployment to one or more new host or target clouds. In aspects, the virtual machine image manager, set of migratable virtual machine images, and/or other data, objects, and/or resources related to the application complement of the set of virtual machines can be fully integrated in the kernel of the cloud-based operating system. In aspects, the kernel-level integration of resources used to generate application inventories and virtual machine images can permit the analysis and deployment or migration of virtual machine sets with their application inventories directly via those operating system-based resources, without a need to invoke or use a separate interrogation or migration tool. The efficiency and reliability of virtual machine management including potential deployments and/or migrations can therefore be enhanced.

Figure 3:
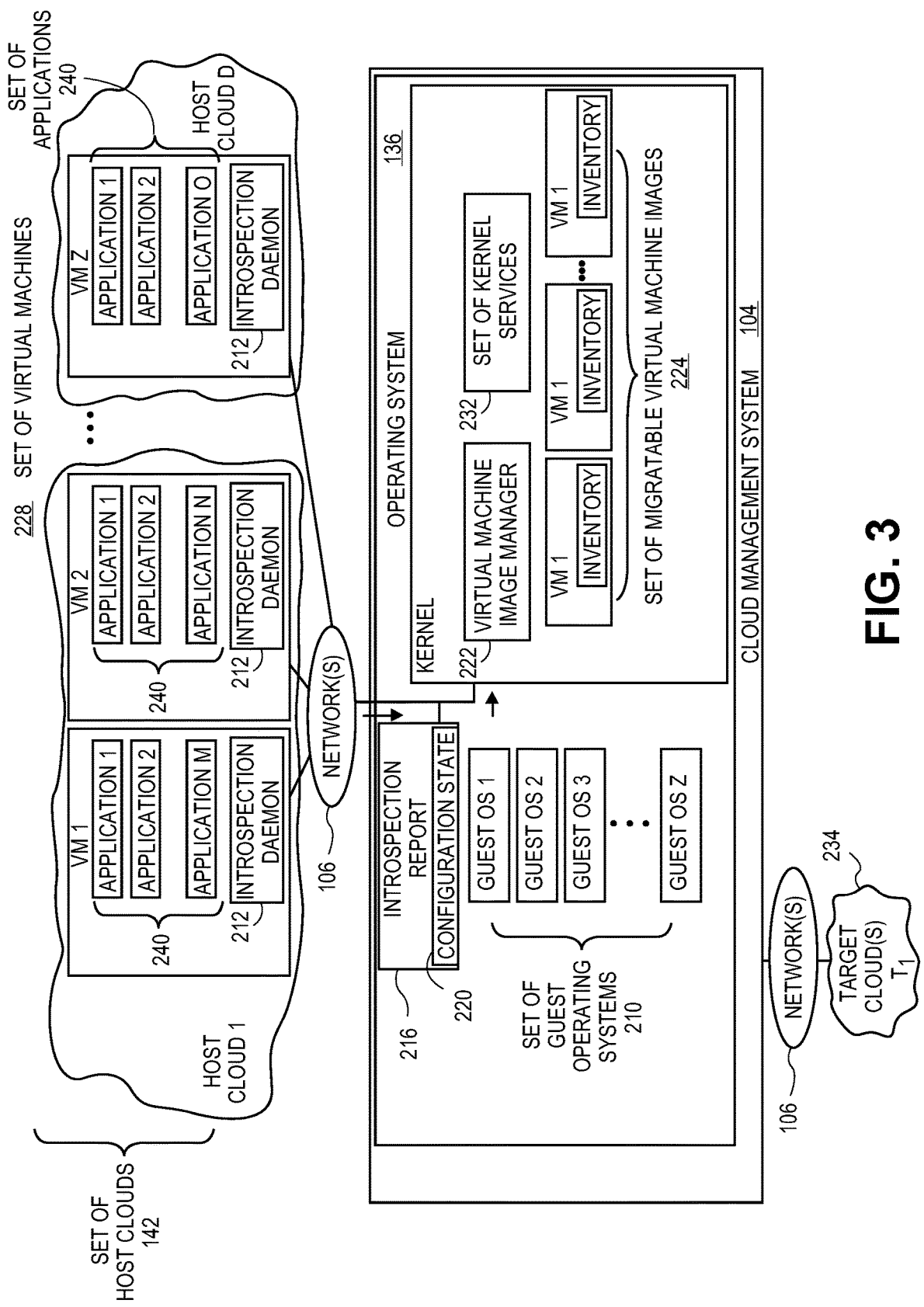
FIG. 3 illustrates a network configuration in which systems and methods for introspective application reporting to facilitate virtual machine movement between cloud hosts can be implemented, including the capture of migratable virtual machine images at kernel level of a cloud-based operating system.

Consistent with the foregoing, in general, FIG. 3 shows an illustrative network configuration in which systems and methods for introspective application reporting to facilitate virtual machine movement between cloud hosts can be implemented, according to various embodiments. In embodiments as shown, one or more users can operate a set of virtual machines 228 in a set of host clouds 142, for instance, by subscribing to resources in the set of host clouds 142 to support, provide, and/or execute the set of virtual machines 228 according to service level agreements (SLAs) and/or other terms or arrangements. In aspects, each virtual machine in the set of virtual machines 228 can have a set of applications 240 installed or instantiated in that machine, such as browsing, messaging, word processing, spreadsheet, and/or other applications or application types. According to aspects, each virtual machine in the set of virtual machines 228 can operate on a guest operating system assigned to that machine in a set of guest operating systems 210 managed by the operating system 136 of the cloud-based network, which can be hosted and/or executed in or by a cloud management system 104 associated with the set of host clouds 142.

In aspects as shown, one or more virtual machines in the set of virtual machines 228 can be configured with an associated introspection daemon 212, which can be or include an application, service, and/or other resource operating in the associated virtual machine to detect, discover, inventory, and generate a report of the set of applications 240 installed and/or instantiated on that subject virtual machine. In aspects, the introspection daemon 212 can be configured and/or installed by an administrator and/or other user managing the cloud management system 104, and/or by other entities. In aspects, the introspection daemon 212 can interrogate and probe the set of applications 240 on the associated virtual machine, and generate an introspection report 216 based on that discovery process or inspect. In embodiments, the introspection daemon 212 can discover and acquire a list of the set of applications 240 via the corresponding guest operating system for the subject machine in the set of guest operating systems 210, and/or can interrogate the subject virtual machine using other connections, channels, and/or resources. In aspects, the introspection report 216 can include a listing or other summary of the set of applications 240, and in addition or instead can include a configuration state 220 of the set of applications 240 and/or the virtual machine hosting those applications and/or other software, services, or resources. It will be noted that while the introspection daemon 212 is illustrated as being installed or hosted as a separate logic or service in each virtual machine, in aspects, the introspection daemon 212 can be configured, hosted, and/or installed in other ways, such as by being incorporated in one or more applications in the set of applications 240, by installation or hosting in a separate virtual machine, and/or deployment in other machines, software, and/or resources.

In embodiments as shown, the introspection daemon 212 installed in each virtual machine can be configured to transmit or communicate the introspection report 216 to the operating system 136 of the cloud management system 104 that controls the set of host clouds 142. In aspects, the introspection daemon 212 can more particularly be configured to transmit the introspection report 216 and/or associated data to a kernel 218 of the operating system 136 installed on or hosted by the cloud management system 104. In embodiments as shown, the kernel 218 can comprise or host a set of kernel resources 232, such as file management, memory management, virtualization resources, and/or other resources to support the operation of the cloud management system 104 and/or the operation of the set of host clouds 142 in which the set of virtual machines 228 operate. In aspects as shown, the kernel 218 can also host a virtual machine image manager 222, which can receive and process the introspection report 216 and/or other reports or information related to the operation of the set of virtual machines 228, including the state of the set of applications 240 installed or instantiated in each of those virtual machines.

The virtual machine image manager 222 can itself be configured to build, generate, store, and manage a set of migratable virtual machine images 224 for the set of virtual machines 228, which images can include executable images and/or other representations of the set of applications 240 installed in each virtual machine. In aspects, the set of migratable virtual machine images 224 can also include further data extracted from the configuration state 220 of each machine and/or from other data, to capture and reflect the operating state or execution state of each application that is operating or instantiated on each virtual machine in the set of virtual machines 228. The execution state recorded for each application on each virtual machine can comprise information such as, merely for example, authorized users currently using the application or who have recently used the application, an execution state of any one or more threads associated with each application, data files and/or other data sources association with each application in the set of applications 240, a security state for those applications, and/or other details of the configuration and/or execution of each virtual machine and/or its set of applications 240. In aspects, the capture of a detailed configuration state for the subject virtual machine(s) and/or associated applications can permit a more rapid, efficient, and/or accurate migration of the set of virtual machines 228 and/or the associated set of applications 240 for those machines to one or more target clouds 234 based on the set of migratable virtual machine images 224. It may be noted that the potential migration or movement of the virtual machines and/or applications can be initiated and managed from the virtual machine image manager 222 hosted or residing in the kernel 218, without requiring additional tools, functions calls, applications, and/or other software or resources. The potential migration of one or more virtual machines and/or applications in those virtual machines can in cases be conditioned and/or triggered by resource consumption conditions taking place in the set of host clouds 142, can be based on predetermined schedules, and/or can be triggered or conducted based on other factors.

Figure 4:
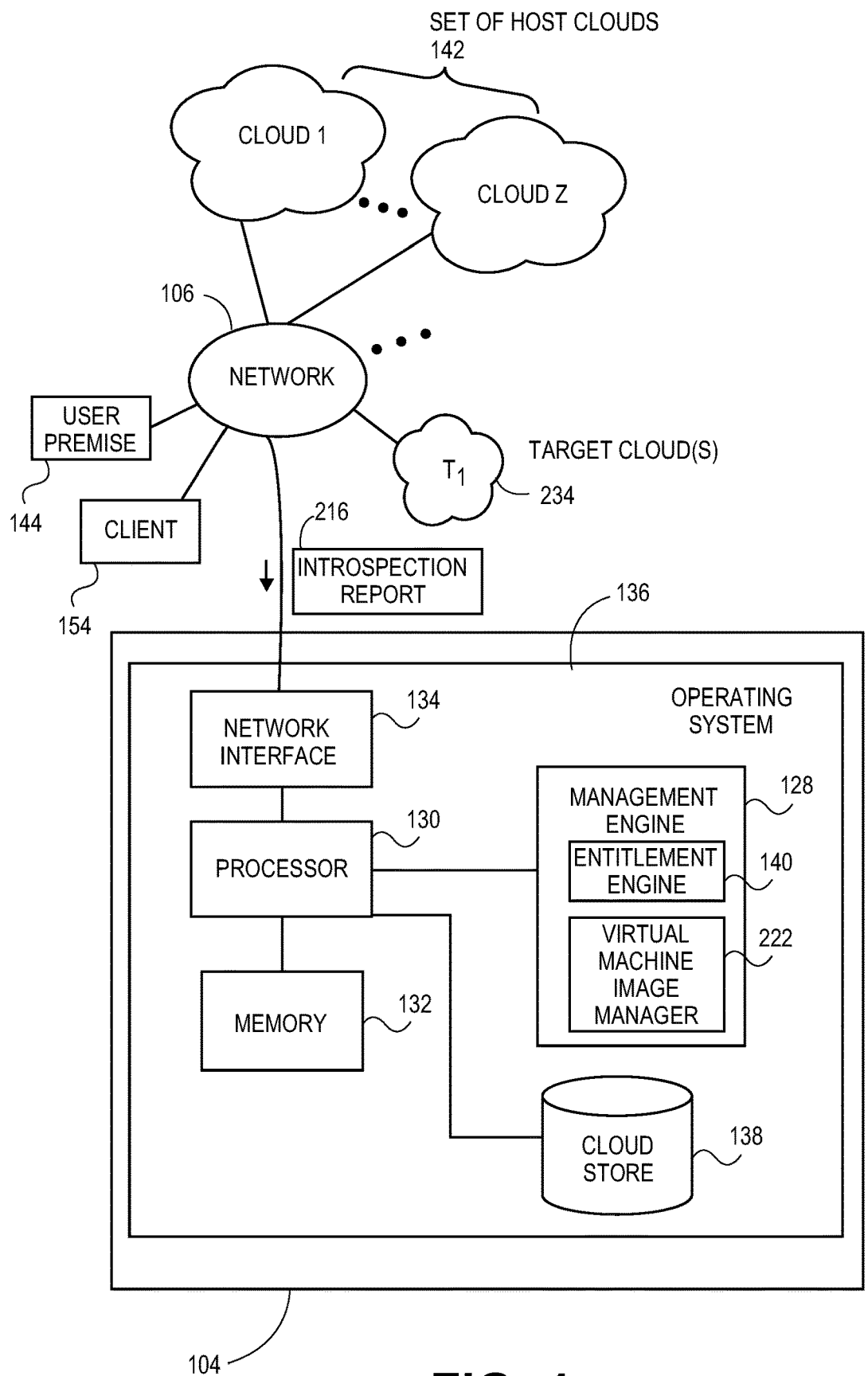
FIG. 4 illustrates an exemplary hardware configuration for a cloud management system and/or other hardware that can support and maintain one or more cloud-based networks, according to various embodiments.

FIG. 4 illustrates an exemplary diagram of hardware and other resources that can be incorporated in a cloud management system 104 configured to communicate with the set of instantiated virtual machines 116, entitlement engine 140, set of host clouds 142, and/or other entities, services, or resources via one or more networks 106 and/or other connections, according to embodiments. In embodiments as shown, the cloud management system 104 can comprise a processor 130 communicating with memory 132, such as electronic random access memory, operating under control of or in conjunction with an operating system 136. The operating system 136 can be, for example, a distribution of the Linux™ operating system, the Unix™ operating system, or other open-source or proprietary operating system or platform. The processor 130 also communicates with a cloud store 138, such as a database stored on a local hard drive, a management engine 128, and the virtual machine image manager 222 to execute control logic and control the operation of the set of virtual machines 228 and/or other resources in one or more clouds 102, the set of host clouds 142, and/or other collections of clouds. The processor 130 further communicates with a network interface 134, such as an Ethernet or wireless data connection, which in turn communicates with the one or more networks 106, such as the Internet or other public or private networks. The processor 130 and/or the cloud management system 104 can likewise communicate with other interfaces, applications, machines, sites, services, data, and/or logic. Other configurations of the cloud management system 104, associated network connections, and other hardware, software, and service resources are possible. It may be noted that in embodiments, other hardware machines, platforms, or engines can comprise the same or similar resources as cloud management system 104, or can be configured with different hardware and software resources.

Figure 5:
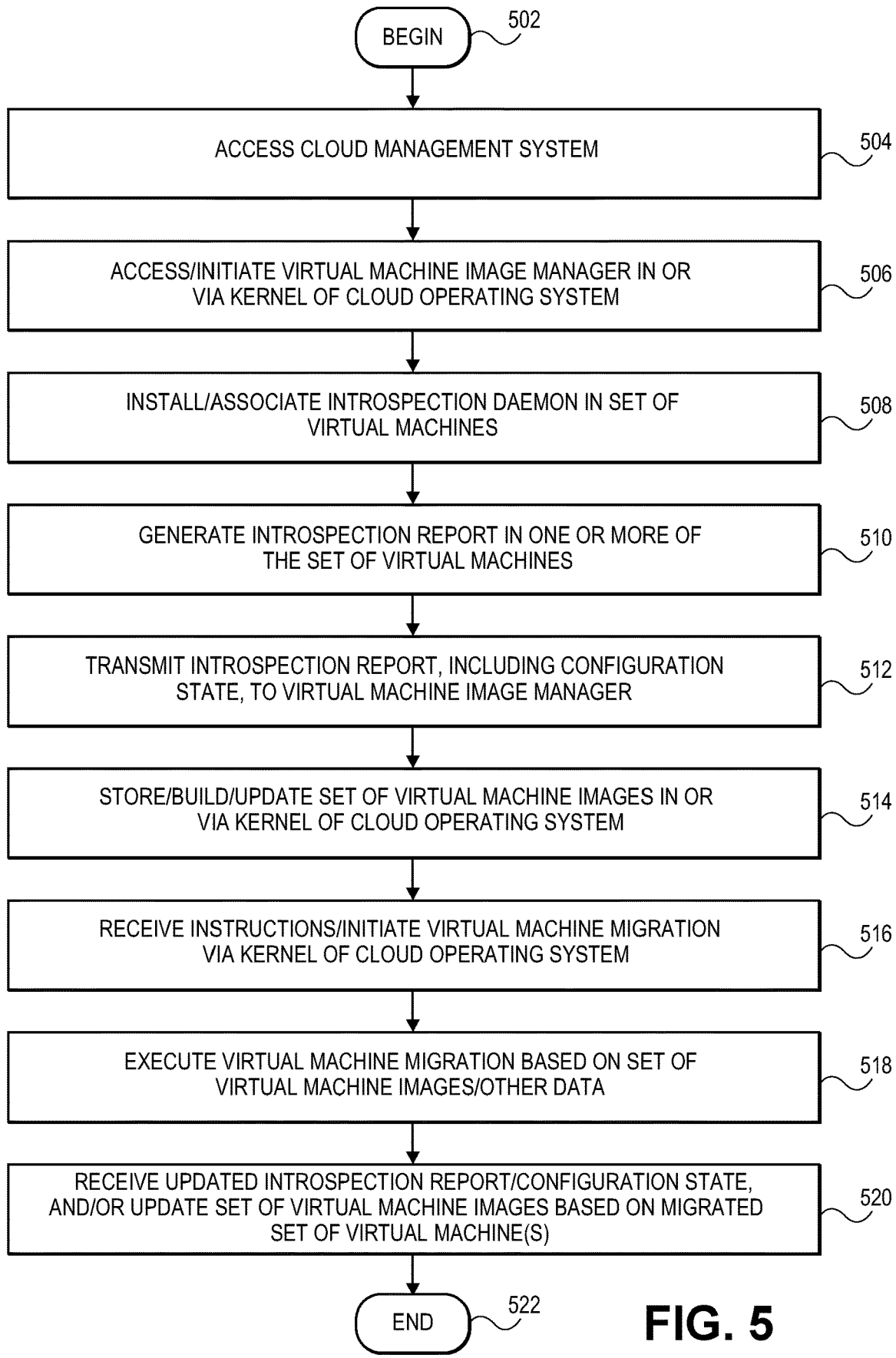
FIG. 5 illustrates a flowchart for the analysis and processing of virtual machine application inventories and other configuration data that can be used in systems and methods for introspective application reporting to facilitate virtual machine movement between cloud hosts, according to various embodiments

FIG. 5 illustrates a flowchart of overall processing to perform application inventorying and reporting and other virtual machine management operations, according to various embodiments of the present teachings. In 502, processing can begin. In 504, an administrator and/or other use can access the cloud management system 104 associated with the set of host clouds 142 hosting the set of virtual machines 228. In 506, the virtual machine image manager 222 can be accessed and/or initiated via the kernel 218 of the operating system 136. In 508, the introspection daemon 212 can be installed in, instantiated in, and/or associated with one or more virtual machine in the set of virtual machines 228. In aspects, the introspection daemon 212 can be registered to, or in implementations can be instantiated in the set of guest operating systems 210. In 510, an introspection report 216 can be generated in one or more virtual machine in the set of virtual machines 228 hosted in the set of host clouds 142, for instance, via the introspection daemon 212.

The introspection report 216 can be generated, for example, by interrogating or accessing the guest operating system associated with the subject virtual machine, and identifying those applications, threads, processes, execution states, associated data and/or data locations, and/or other information related to configuration of virtual machines in the set of virtual machines 228. In 512, the introspection daemon 212 and/or other logic, application, and/or service can transmit the introspection report 216, including a representation of the configuration state 220 of each virtual machine, to the virtual machine image manager 222 of the kernel 218 of operating system 136 of or supported by the cloud management system 104.

In 514, the virtual machine image manager 222 and/or other kernel-based logic or service can store, build, and/or update the set of migratable virtual machine images 224 containing images of the set of applications 240 and/or other configurations, states, and/or resources of virtual machines in the set of virtual machines 228. In 516, the virtual machine image manager 222 can receive instructions to, and/or can automatically or otherwise initiate, the migration of one or more virtual machine of the set of virtual machines 228 via the kernel 218 of the operating system 136.

In 518, the virtual machine image manager 222 and/or other kernel-based logic or service can execute the migration of one or more virtual machines based on the set of migratable virtual machine images 224 and/or other information, commands, and/or data. In 520, the virtual machine image manager 222 and/or other kernel-based logic or service can received one or more updated introspection report(s) 216, and/or can update the set of migratable virtual machine images 224, based on the operation of the migration set of virtual machines. In 522, as understood by persons skilled in the art, processing can repeat, return to a prior processing point, jump to a further processing point, or end.

The foregoing description is illustrative, and variations in configuration and implementation may occur to persons skilled in the art. For example, while embodiments have been described in which the cloud management system 104 for a particular cloud resides in a single server or platform, in embodiments the cloud management system 104 and associated logic can be distributed among multiple servers, services, or systems. Similarly, while embodiments have been described in which one group of servers within a set of resource servers 108 can provide one component to build a requested set of virtual machines, in embodiments, one group of resource servers can deliver multiple components to populate the requested set of instantiated virtual machines 116, and/or other machines, entities, services, or resources. Likewise, while embodiments have been described in which one virtual machine image manager 222 and/or other tools operate to manage the configuration and migration of the set of virtual machines 228 in a set of host clouds 142, in embodiments, multiple kernel-based or kernel-level virtual machine managers or engines, and/or other logic or services can perform the same or similar logic to manage deployment options. Other resources described as singular or integrated can in embodiments be plural or distributed, and resources described as multiple or distributed can in embodiments be combined. The scope of the invention is accordingly intended to be limited only by the following claims.

What is claimed is:

1. A method comprising:
receiving, by a processor executing a kernel-based service integrated in a kernel of a centralized server that manages a set of virtual machines, from an introspection daemon running on a virtual machine in the set of virtual machines, an introspection report comprising configuration state data of the virtual machine for a migration of the virtual machine to at least one target cloud of a plurality of clouds managed by the centralized server, wherein the virtual machine comprises a guest operating system hosting the introspection daemon, wherein the configuration state data comprises an execution state of an application running on the guest operating system of the virtual machine, and wherein the centralized server manages another set of virtual machines in the at least one target cloud;
in response to receiving the introspection report from the introspection daemon running on the virtual machine, generating, by the kernel-based service of the centralized server, a virtual machine image of the virtual machine in view of the configuration state data of the introspection report; and
initiating, by the kernel-based service of the centralized server, the migration of the virtual machine to the at least one target cloud in view of the virtual machine image.

2. The method of claim 1, wherein the configuration state data further comprises at least one of:
identifiers of users that currently use the application running on the guest operating system of the virtual machine, a security state of the application running on the guest operating system of the virtual machine,
an inventory of applications installed in the virtual machine, or
an installed version of each of the applications in the inventory of applications.

3. The method of claim 1, further comprising:
launching, by the processor, the virtual machine running the introspection daemon; and
accessing, by the kernel-based service, the introspection daemon running on the virtual machine in the set of host clouds.

4. The method of claim 1, wherein the virtual machine is configured with the introspection daemon to detect, inventory, and generate a report of the application running on the guest operating system of the virtual machine.

5. The method of claim 1, wherein the initiating of the migration of the virtual machine to the at least one target cloud comprises initiating the migration of the virtual machine based on a resource consumption condition in the at least one target cloud.

6. The method of claim 1, further comprising:
receiving an updated introspection report; and
updating the virtual machine image of the virtual machine in view of the updated introspective report.

7. The method of claim 1, wherein the introspection report is generated in view of at least one of a scheduled basis or an event-triggered basis.

8. A system of a centralized server that manages a set of virtual machines comprising:
a memory; and
a processor, operatively coupled to the memory, being configured to:
receive, by a kernel-based service integrated in a kernel of the centralized server from an introspection daemon running on a virtual machine in the set of virtual machines, an introspection report comprising configuration state data of the virtual machine for a migration of the virtual machine to at least one target cloud of a plurality of clouds managed by the centralized server, wherein the virtual machine comprises a guest operating system hosting the introspection daemon, wherein the configuration state data comprises an execution state of an application running on the guest operating system of the virtual machine, and wherein the centralized server manages another set of virtual machines in the at least one target cloud;
in response to receipt of the introspection report from the introspection daemon running on the virtual machine, generate, by the kernel-based service of the centralized server, a virtual machine image of the virtual machine in view of the introspection report; and
initiate, by the kernel-based service of the centralized server, the migration of the virtual machine to at least one target cloud in view of the virtual machine image.

9. The system of claim 8, wherein the configuration state data further comprises at least one of:
identifiers of users that currently use the application running on the guest operating system of the virtual machine,
a security state of the application running on the guest operating system of the virtual machine,
an inventory of applications installed in the virtual machine, or
an installed version of each of the applications in the inventory of applications.

10. The system of claim 8,
the processor further to:
launch the virtual machine running the introspection daemon; and
access the introspection daemon running on the virtual machine in the set of host clouds.

11. The system of claim 8, wherein the virtual machine is configured with the introspection daemon to detect, inventory, and generate a report of the application running on the guest operating system of the virtual machine.

12. The system of claim 8, wherein to initiate the migration of the virtual machine to the at least one target cloud, the processor further to initiate the migration of the virtual machine based on a resource consumption condition in the at least one target cloud.

13. The system of claim 8, the processor further to:
receive an updated introspection report; and
update the virtual machine image of the virtual machine in view of the updated introspective report.

14. The system of claim 8, wherein the introspection report is generated in view of at least one of a scheduled basis or an event-triggered basis.

15. A non-transitory computer-readable medium, the non-transitory computer-readable medium having recorded thereon instructions that when executed by a processor, perform operations comprising:
receiving, by the processor executing a kernel-based service integrated in a kernel of a centralized server that manages a set of virtual machines, from an introspection daemon running on a virtual machine in the set of virtual machines, an introspection report comprising configuration state data of the virtual machine for a migration of the virtual machine to at least one target cloud of a plurality of clouds managed by the centralized server, wherein the virtual machine comprises a guest operating system hosting the introspection daemon, wherein the configuration state data comprises an execution state of an application running on the guest operating system of the virtual machine, and wherein the centralized server manages another set of virtual machines in the at least one target cloud;
in response to receiving the introspection report from the introspection daemon running on the virtual machine, generating, by the kernel-based service of the centralized server, a virtual machine image of the virtual machine in view of the configuration state data of the introspection report; and
initiating, by the kernel-based service of the centralized server, the migration of the virtual machine to the at least one target cloud in view of the virtual machine image.

16. The non-transitory computer-readable medium of claim 15, wherein the configuration state data further comprises at least one of:
identifiers of users that currently use the application running on the guest operating system of the virtual machine,
a security state of the application running on the guest operating system of the virtual machine,
an inventory of applications installed in the virtual machine, or
an installed version of each of the applications in the inventory of applications.

17. The non-transitory computer-readable medium of claim 15, the operations further comprising:

launching, by the kernel-based service, the virtual machine running the introspection daemon; and accessing, by the kernel-based service, the introspection daemon running on the virtual machine in the set of host clouds.

18. The non-transitory computer-readable medium of claim 15, wherein the virtual machine is configured with the introspection daemon to detect, inventory, and generate a report of the application running on the guest operating system of the virtual machine.

19. The non-transitory computer-readable medium of claim 15, the operations further comprising:

receiving an updated introspection report; and update the virtual machine image of the virtual machine in view of the updated introspective report.

20. The non-transitory computer-readable medium of claim 15, wherein the introspection report is generated in view of at least one of a scheduled basis or an event-triggered basis.

\* \* \* \* \*